US009014138B2

(12) United States Patent
Fong et al.

(10) Patent No.: US 9,014,138 B2
(45) Date of Patent: Apr. 21, 2015

(54) SYSTEM AND METHOD FOR A VIRTUAL CARRIER FOR MULTI-CARRIER AND COORDINATED MULTI-POINT NETWORK OPERATION

(75) Inventors: Mo-Han Fong, Ottawa (CA); Sean McBeath, Keller, TX (US); Zhijun Cai, Euless, TX (US); Hua Xu, Ottawa (CA); Mark Earnshaw, Kanata (CA); Youn Hyoung Heo, Waterloo (CA); Sophie Vrzic, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 751 days.

(21) Appl. No.: 12/537,867

(22) Filed: Aug. 7, 2009

(65) Prior Publication Data

US 2011/0034175 A1   Feb. 10, 2011

(51) Int. Cl.
 *H04W 72/04*  (2009.01)
 *H04B 7/02*   (2006.01)
 *H04L 5/00*   (2006.01)

(52) U.S. Cl.
 CPC ............. *H04W 72/042* (2013.01); *H04B 7/024* (2013.01); *H04L 5/001* (2013.01); *H04L 5/0032* (2013.01); *H04L 5/0035* (2013.01)

(58) Field of Classification Search
 None
 See application file for complete search history.

(56) References Cited

U.S. PATENT DOCUMENTS

| | | | | |
|---|---|---|---|---|
| 6,064,661 A | * | 5/2000 | Benn | 370/329 |
| 6,212,382 B1 | * | 4/2001 | Watson et al. | 455/444 |
| 6,493,331 B1 | * | 12/2002 | Walton et al. | 370/341 |
| 6,731,938 B1 | * | 5/2004 | Seo et al. | 455/446 |
| 7,032,235 B2 | * | 4/2006 | Pelkey et al. | 725/36 |
| 7,079,552 B2 | * | 7/2006 | Cain et al. | 370/469 |
| 7,145,890 B1 | * | 12/2006 | Seo et al. | 370/331 |
| 7,400,856 B2 | * | 7/2008 | Sartori et al. | 455/7 |
| 7,929,970 B1 | * | 4/2011 | Gunasekara et al. | 455/444 |
| 8,761,824 B2 | * | 6/2014 | Palanki et al. | 455/522 |
| 2002/0102994 A1 | * | 8/2002 | Tuutijarvi | 455/456 |

(Continued)

FOREIGN PATENT DOCUMENTS

| | | |
|---|---|---|
| CN | 101129038 A | 2/2008 |
| JP | 2007174309 A | 7/2007 |
| WO | WO03007645 A1 | 1/2003 |

OTHER PUBLICATIONS

InterDigital: "Proposed Way Forward for LTE-A Relay Type 11"3GPP Draft; R1-092588, 3rd Generation Partnership Project (3GPP), no. Los Angeles, USA; Jun. 26, 2009, XP050351084.*

(Continued)

*Primary Examiner* — Dung B Huynh
(74) *Attorney, Agent, or Firm* — Conley Rose, P.C.; J. Robert Brown, Jr.

(57) ABSTRACT

A method for implementing coordinated multi-point transmission and reception in a multi-carrier network system including a first serving network node and a second cooperating network node is disclosed. The method includes the steps of configuring a first transmission channel. The first transmission channel is established on the first serving network node. The method includes configuring a second transmission channel. The second transmission channel is established on the second cooperating node. The method includes transmitting control information using the first transmission channel. The control information allocates a resource on the second transmission channel and the second transmission channel is not established on the first serving network node.

33 Claims, 7 Drawing Sheets

(56) References Cited

U.S. PATENT DOCUMENTS

| | | | |
|---|---|---|---|
| 2005/0130644 A1* | 6/2005 | Bassompierre et al. | 455/422.1 |
| 2006/0030351 A1* | 2/2006 | Miller et al. | 455/522 |
| 2007/0002766 A1* | 1/2007 | Park et al. | 370/254 |
| 2007/0132639 A1* | 6/2007 | Korneluk et al. | 342/464 |
| 2007/0176787 A1* | 8/2007 | Iten et al. | 340/825.69 |
| 2007/0218840 A1* | 9/2007 | Gerlach et al. | 455/63.2 |
| 2008/0009241 A1* | 1/2008 | Do et al. | 455/9 |
| 2008/0020766 A1* | 1/2008 | Chen et al. | 455/435.2 |
| 2008/0031174 A1* | 2/2008 | Saifullah et al. | 370/311 |
| 2008/0200202 A1* | 8/2008 | Montojo et al. | 455/522 |
| 2009/0131069 A1* | 5/2009 | Wu et al. | 455/452.2 |
| 2009/0175214 A1* | 7/2009 | Sfar et al. | 370/315 |
| 2009/0185638 A1* | 7/2009 | Imamura et al. | 375/298 |
| 2009/0196174 A1* | 8/2009 | Ji | 370/230.1 |
| 2009/0196245 A1* | 8/2009 | Ji | 370/329 |
| 2009/0323640 A1* | 12/2009 | Chakrabarti et al. | 370/335 |
| 2010/0035555 A1* | 2/2010 | Bala et al. | 455/63.1 |
| 2010/0040006 A1* | 2/2010 | Caire | 370/329 |
| 2010/0041409 A1* | 2/2010 | Kim et al. | 455/450 |
| 2010/0080187 A1* | 4/2010 | Papasakellariou et al. | 370/329 |
| 2010/0080269 A1* | 4/2010 | Kim et al. | 375/211 |
| 2010/0091678 A1* | 4/2010 | Chen et al. | 370/329 |
| 2010/0098012 A1* | 4/2010 | Bala et al. | 370/329 |
| 2010/0103821 A1* | 4/2010 | Palanki et al. | 370/241 |
| 2010/0177746 A1* | 7/2010 | Gorokhov et al. | 370/336 |
| 2010/0203887 A1* | 8/2010 | Kim | 455/434 |
| 2010/0215011 A1* | 8/2010 | Pan et al. | 370/329 |
| 2010/0222069 A1* | 9/2010 | Abraham et al. | 455/452.2 |
| 2010/0232373 A1* | 9/2010 | Nory et al. | 370/329 |
| 2010/0238854 A1* | 9/2010 | Kazmi et al. | 370/315 |
| 2010/0246465 A1* | 9/2010 | Cai et al. | 370/311 |
| 2010/0254301 A1* | 10/2010 | Blankenship et al. | 370/315 |
| 2010/0254329 A1* | 10/2010 | Pan et al. | 370/329 |
| 2010/0265842 A1* | 10/2010 | Khandekar et al. | 370/252 |
| 2010/0265874 A1* | 10/2010 | Palanki et al. | 370/315 |
| 2010/0267394 A1* | 10/2010 | Wu | 455/450 |
| 2010/0273444 A1* | 10/2010 | Wu | 455/404.1 |
| 2010/0279689 A1* | 11/2010 | Tinnakornsrisuphap et al. | 455/435.2 |
| 2010/0285809 A1* | 11/2010 | Lindstrom et al. | 455/450 |
| 2010/0290352 A1* | 11/2010 | Oyman et al. | 370/252 |
| 2010/0304748 A1* | 12/2010 | Henttonen et al. | 455/436 |
| 2010/0309867 A1* | 12/2010 | Palanki et al. | 370/329 |
| 2010/0315989 A1* | 12/2010 | Reznik et al. | 370/315 |
| 2010/0329216 A1* | 12/2010 | Jen | 370/332 |
| 2010/0331037 A1* | 12/2010 | Jen | 455/522 |
| 2011/0013552 A1* | 1/2011 | Ali et al. | 370/315 |
| 2011/0013581 A1* | 1/2011 | Lee et al. | 370/329 |
| 2011/0013710 A1* | 1/2011 | Xiao | 375/260 |
| 2011/0026473 A1* | 2/2011 | Luo et al. | 370/329 |
| 2011/0028148 A1* | 2/2011 | Lee et al. | 455/435.2 |
| 2011/0032890 A1* | 2/2011 | Wu | 370/329 |
| 2011/0058492 A1* | 3/2011 | Ernstrom | 370/252 |
| 2011/0081856 A1* | 4/2011 | Johansson et al. | 455/7 |
| 2011/0098054 A1* | 4/2011 | Gorokhov et al. | 455/452.1 |
| 2011/0105129 A1* | 5/2011 | Kim et al. | 455/443 |
| 2011/0134868 A1* | 6/2011 | Lee et al. | 370/329 |
| 2011/0136490 A1* | 6/2011 | Aoyagi | 455/443 |
| 2011/0141971 A1* | 6/2011 | Zhang et al. | 370/328 |
| 2011/0143796 A1* | 6/2011 | Lee et al. | 455/507 |
| 2011/0164550 A1* | 7/2011 | Chen et al. | 370/315 |
| 2011/0170474 A1* | 7/2011 | Ji et al. | 370/315 |
| 2011/0171992 A1* | 7/2011 | Seo et al. | 455/522 |
| 2011/0188594 A1* | 8/2011 | Kim et al. | 375/260 |
| 2011/0199975 A1* | 8/2011 | Wu | 370/328 |
| 2011/0243066 A1* | 10/2011 | Nayeb Nazar et al. | 370/328 |
| 2011/0269459 A1* | 11/2011 | Koo et al. | 455/434 |
| 2011/0274047 A1* | 11/2011 | Kwon et al. | 370/328 |
| 2011/0274066 A1* | 11/2011 | Tee et al. | 370/329 |
| 2011/0294491 A1* | 12/2011 | Fong et al. | 455/422.1 |
| 2011/0317552 A1* | 12/2011 | Lee et al. | 370/228 |
| 2011/0317652 A1* | 12/2011 | Kim et al. | 370/329 |
| 2011/0317653 A1* | 12/2011 | Kwon et al. | 370/329 |
| 2012/0008546 A1* | 1/2012 | Yokoyama et al. | 370/315 |
| 2012/0026976 A1* | 2/2012 | Chang et al. | 370/331 |
| 2012/0039179 A1* | 2/2012 | Seo et al. | 370/241 |
| 2012/0063403 A1* | 3/2012 | Moon et al. | 370/329 |
| 2012/0087273 A1* | 4/2012 | Koo et al. | 370/252 |

OTHER PUBLICATIONS

Alcatel Shanghai Bell et al: "Relaying for LTE-Advanced", 3GPP Draft; R1-090066 Relaying for LTE-Advanced, 3rd Generation Partnership Project (3GPP), no. Ljubljana; Jan. 8, 2009, XP050318011.*

PCT International Search Report and Written Opinion, Application No. PCT/US2010/044540, Jan. 24, 2011.

Alcatel Shanghai Bell, et al., Relaying for LTE-Advanced, 3GPP TSG RAN WG1 Meeting #55bis, R1-090066, Ljubijana, Slovenia, Jan. 12-16, 2009.

Fujitsu, Efficient HARQ Protocol for SIC Based DL CoMP, 3GPP TSG-RAN1 #57bis, R1-092431, Los Angeles, CA, USA, Jun. 29-Jul. 3, 2009.

InterDigital, Proposed Way Forward for LTE-A Relay Type II, 3GPP TSG-RAN WG1 Meeting #57bis, R1-092588, Los Angeles, CA, USA, Jun. 29-Jul. 3, 2009.

Research in Motion, et al., Type-II Relay Reference Signal Transmission and UE Association, 3GPP TSG RAN WG1 Meeting #57bis, R1-092419, Los Angeles, CA, USA, Jun. 29-Jul. 3, 2009.

Research in Motion, et al., Support of Carrier Aggregation with Heterogeneous Deployment of Component Carriers, 3GPP TSG RAN WG1 Meeting #58, R1-093289, Shenzhen, China, Aug. 24-Aug. 28, 2009.

Sharp, CoMP Configuration for Multiple Component Carriers in LTE-A, 3GPP TSG RAN WG1 Meeting #56bis, R1-091134, Seoul, Korea, Mar. 23-27, 2009.

Vodafone, et al., Type II Relay Enhancement by Resource Reuse, 3GPP TSG RAN WG1 #57, R1-091967, San Francisco, USA, May 4-8, 2009.

European Extended Search Report; Application No. 12158110.2; May 29, 2012; 12 pages.

Japanese Office Action; Application No. 2012-523946; May 28, 2013; 6 pages.

3GPP TR 36.814 V0.4.1; 3rd Generation Partnership Project; Technical Specification Group Radio Access Network; Further Advancements for E-UTRA Physical Layer Aspects; Release 9; Feb. 2009; 31 pages.

3GPP TR 36.912 V0.2.0; 3rd Generation Partnership Project; Technical Specification Group Radio Access Network; Feasibility Study for Further Advancements for E-UTRA (LTE-Advanced); Release 9; Aug. 2009; 31 pages.

Korean Office Action; Application No. 10-2012-7005851; Oct. 15, 2013; 15 pages.

Canadian Office Action; Application No. 2,770,370; Dec. 2, 2013; 3 pages.

Chinese Office Action; Application No. 201080044929.4; Dec. 26, 2014; 21 pages.

Canadian Office Action; Application No. 2,770,370; Sep. 11, 2014; 3 pages.

Chinese Office Action; Application No. 201080044929.4; Aug. 12, 2014; 19 pages.

* cited by examiner

SYSTEM AND METHOD FOR A VIRTUAL CARRIER FOR MULTI-CARRIER AND COORDINATED MULTI-POINT NETWORK OPERATION

BACKGROUND

The present invention relates generally to data transmission in communication systems and more specifically to methods and systems for facilitating multi-carrier and coordinated multi-point operation in a mobile communication system.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment will eventually result in an LTE advanced (LTE-A) system. As used herein, the phrase "base station" will refer to any component, such as a traditional base station or an LTE or LTE-A base station (including eNBs), that can provide a UA with access to other components in a telecommunications system.

In mobile communication systems such as the E-UTRAN, a base station provides radio access to one or more UAs. The base station comprises a packet scheduler for dynamically scheduling downlink traffic data packet transmissions and allocating uplink traffic data packet transmission resources among all the UAs communicating with the base station. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a control channel.

To facilitate communications, a plurality of different communication channels are established between a base station and UA 10 including, among other channels, a Physical Downlink Control Channel (PDCCH). As the label implies, the PDCCH is a channel that allows the base station to control UA 10 during downlink data communications. To this end, the PDCCH is used to transmit scheduling assignment or control data packets referred to as Downlink Control Information (DCI) packets to the UA 10 to indicate scheduling to be used by UA 10 to receive downlink communication traffic packets on a Physical Downlink Shared Channel (PDSCH) or transmit uplink communication traffic packets on Physical Uplink Shared Channel (PUSCH) or specific instructions to the UA (e.g. power control commands, an order to perform a random access procedure, or a semi-persistent scheduling activation or deactivation). A separate DCI packet may be transmitted by the base station to UA 10 for each traffic packet/sub-frame transmission.

It is generally desirable to provide high data rate coverage using signals that have a high Signal to Interference Plus Noise ratio (SINR) for UAs serviced by a base station. Typically, only those UAs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

In some cases, carrier aggregation can be used to support wider transmission bandwidths and increase the potential peak data rate for communications between UA, base station and/or other network components. In carrier aggregation, multiple component carriers are aggregated and may be allocated in a sub-frame to a UA as shown in FIG. 1. FIG. 1 shows carrier aggregation in a communications network where each component carrier has a bandwidth of 20 MHz and the total system bandwidth is 100 MHz. As illustrated, the available bandwidth 100 is split into a plurality of carriers 102. UA may receive or transmit on multiple component carriers (up to a total of five carriers 102 in the example shown in FIG. 1), depending on the UA's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

Additionally, coordinated multi-point (CoMP) transmission and reception may be used to increase transmission data rate and/or signal quality in wireless communication networks such as LTE-A networks. Using CoMP, neighboring base stations may coordinate to improve the user throughput or signal quality, especially for users at the cell edge. CoMP may be implemented using a combination of base stations such as eNBs, remote radio heads and/or relay nodes (RN) and/or other types of network nodes and/or cells.

In communication networks implementing CoMP, difficulties may arise when different numbers of multiple carriers are deployed among combinations of base stations or other network nodes such as eNBs, RNs, and/or cells. For example, an eNB, RN or cell in a first hotspot location may have 5 carriers deployed while another eNB, RN or cell that is not in a hotspot location may only have 2 carriers deployed. In that case, to implement successful cooperation and coordination of eNBs, RNs, and/or cells for CoMP it may be necessary to consider the set of carriers deployed in and made available by each cooperating eNB, RN, network node or cell individually.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
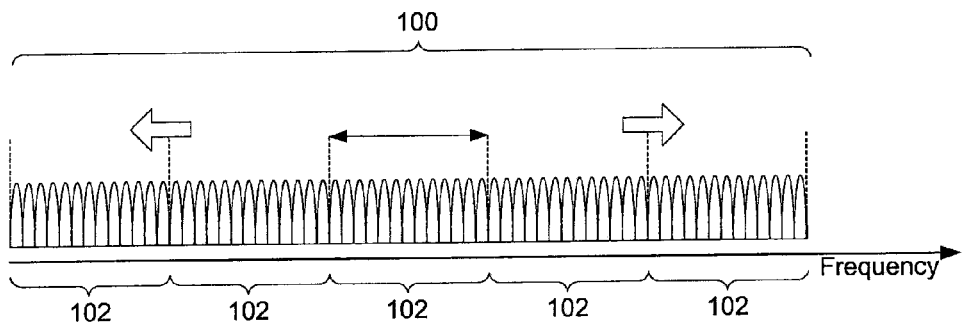
FIG. 1 shows carrier aggregation in a communications network where each component carrier has a bandwidth of 20 MHz and the total system bandwidth is 100 MHz.

The present invention relates generally to data transmission in communication systems and more specifically to methods and systems for facilitating multi-carrier and coordinated multi-point operation in a mobile communication system.

Some embodiments include a method for implementing coordinated multi-point (CoMP) transmission and reception in a multi-carrier network system including a first serving network node/cell and a second cooperating network node/cell. The method includes the steps of configuring a first transmission channel, the first transmission channel being established on the first serving network node/cell, configuring a second transmission channel, the second transmission channel being established on the second cooperating node/cell, and transmitting control information using the first transmission channel, the control information allocating a resource on the second transmission channel. The term 'allocate' used in this context is referring to the control information transmitted using the first transmission channel that indicates the resource assigned on the second transmission channel. The actual scheduling decision of the resource on the second transmission channel may be made by the second cooperating node/cell and communicated to the first serving node/cell. In one implementation, the term 'allocate' means the resource on the second transmission channel is scheduled by the first serving node/cell and indicated by the first serving node/cell using the control information transmitted on the first transmission channel. In this case, some or all of the resources on the second transmission channel are reserved for scheduling by the first serving node/cell while some other resources on the second transmission channel are scheduled by the second cooperating node/cell. The above definitions of 'allocate' or 'allocation' can be applied throughout the description of the invention.

Other embodiments include a method for implementing transmission and reception in a multi-carrier network system including a first serving network node/cell and a second cooperating network node/cell. The method includes the steps of configuring a first transmission channel, the first transmission channel being established on the first serving network node/cell, and transmitting control information using the first transmission channel, the control information allocating a resource on a second transmission channel, the second transmission channel being established on a relay station.

Other embodiments include a wireless communications system. The wireless communications system includes a first base station including a first transmission channel, the first transmission channel being physically transmitted by the first base station, and a second transmission channel, the second transmission channel not being physically transmitted by the first base station. The system includes a second base station including a third transmission channel, the third transmission channel being physically transmitted by the second base station, and the third transmission channel corresponding to the second transmission channel of the first base station. The first base station is configured to transmit control information using the first transmission channel. The control information allocates a resource on the second transmission channel.

Other embodiments include a method for implementing coordinated multi-point (CoMP) transmission and reception in a multi-carrier network system including a first serving evolved universal terrestrial radio access network (E-UTRAN) node B (eNB), relay node (RN) or cell and a second cooperating neighbor eNB, RN or cell. The first serving eNB, RN or cell and the second cooperating neighbor eNB, RN or cell are configured to communicate with a user agent (UA) using at least one of a downlink (DL) and uplink (UL) component carrier and belong to a CoMP cooperating set. The method includes the steps of, when the multi-carrier network system is implementing CoMP transmission and reception, using the first serving eNB, RN or cell to assign at least one of a Physical Downlink Shared CHannel (PDSCH) and a Physical Uplink Shared CHannel (PUSCH) resource on at least one of a plurality of component carriers to the UA. At least one of a plurality of component carriers is deployed by the second cooperating neighbor eNB, RN or cell and is not deployed by the first serving eNB, RN or cell.

Some embodiments include a method for implementing coordinated multi-point (CoMP) in a wireless network system including a first serving evolved universal terrestrial radio access network (E-UTRAN) node B (eNB) and a second cooperating neighbor eNB. The first serving eNB and the second cooperating neighbor eNB are configured to communicate with a user agent (UA) using at least one of a downlink (DL) and uplink (UL) component carrier and belonging to a CoMP cooperating set. The method includes, when the multi-carrier network system is implementing CoMP, using the first serving eNB to assign at least one of a Physical Downlink Shared CHannel (PDSCH) and a Physical Uplink Shared CHannel (PUSCH) resource on at least one of a plurality of component carriers to the UA. The at least one of a plurality of component carriers is deployed by the second cooperating neighbor eNB and is not deployed by the first serving eNB.

Some embodiments include a method for implementing coordinated multi-point (CoMP) transmissions in a wireless network system including a first serving cell of an evolved universal terrestrial radio access network (E-UTRAN) node B (eNB) and a second cooperating cell of an eNB. The first serving cell and the second cooperating neighbor cell are configured to communicate with a user agent (UA) using at least one of a downlink (DL) and uplink (UL) component carrier and belong to a CoMP cooperating set. The method includes, when the multi-carrier network system is implementing CoMP, using the first serving cell to assign at least one of a Physical Downlink Shared CHannel (PDSCH) and a Physical Uplink Shared CHannel (PUSCH) resource on at least one of a plurality of component carriers to the UA. The at least one of a plurality of component carriers is deployed by the second cooperating neighbor cell and is not deployed by the first serving cell.

Some embodiments include an access device for communicating with a user agent (UA) using coordinated multi-point (CoMP). The access device comprises a first serving evolved universal terrestrial radio access network (E-UTRAN) node B (eNB) configured to communicate with the UA using at least one of a downlink (DL) and uplink (UL) component carrier and belonging to a coordinated multi-point (CoMP) cooperating set. The first serving eNB is configured to assign at least one of a Physical Downlink Shared CHannel (PDSCH) and a Physical Uplink Shared CHannel (PUSCH) resource on at least one of a plurality of component carriers to the UA. The at least one of a plurality of component carriers is deployed by a second cooperating neighbor eNB and is not deployed by the first serving eNB.

Some embodiments include an access device for communicating with a user agent (UA) using coordinated multi-point (CoMP). The access device comprises a first serving cell of an evolved universal terrestrial radio access network (E-UTRAN) node B (eNB) configured to communicate with the user agent UA using at least one of a downlink (DL) and uplink (UL) component carrier and belonging to a coordinated multi-point (CoMP) cooperating set. The first serving eNB is configured to assign at least one of a Physical Downlink Shared CHannel (PDSCH) and a Physical Uplink Shared CHannel (PUSCH) resource on at least one of a plurality of component carriers to the UA. The at least one of a plurality of component carriers is deployed by the second cooperating neighbor cell and is not deployed by the first serving cell.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Coordinated multi-point (CoMP) transmission and reception may be used to increase transmission data rates and/or signal quality in wireless communication networks such as LTE-A networks, especially for the cell edge users. Using CoMP, neighboring base stations may coordinate with a UA to improve the user throughput or signal quality by providing multiple transmission points for data. Depending upon the network implementation, multiple network nodes or cells may transmit different data to a single UA to increase the signal bandwidth or data rate to that UA. Alternatively, the different network nodes or cells may be configured to each transmit the same signal to the UA, reinforcing the strength of that signal and improving the transmitted SINR. CoMP may be implemented using a combination of eNBs, relay nodes (RNs), cells and/or other types of network nodes. CoMP can also be applied to a combination of eNBs, RNs, cells and/or other types of network nodes. Several CoMP schemes exist for improving Signal to Interference plus Noise Ratio (SINR), reducing interference, or improving data rate on a resource served by multiple eNBs, RNs or cells.

In one embodiment of CoMP network configurations, a serving node/cell is one that transmits PDCCH assignments. In some implementations, the serving node/cell of a CoMP implementation is analogous to the serving node/cell of a Rel-8 network.

In CoMP, the network may be configured to implement Joint Processing (JP) thereby making data to be transmitted to the UA available at each point of or a subset of a CoMP cooperating set (as defined below). Using JP, the network may implement joint transmission allowing for the transmission of data between a single UA or multiple UAs and multiple network nodes or cells via the PDSCH. The multiple network nodes or cells may include the entire CoMP cooperating set, or only a subset. In joint transmission, data for a single UA may be simultaneously transmitted from multiple transmission points and may coherently or non-coherently improve the received signal quality for the UA and/or cancel active interference for other UAs. In joint transmission, multiple transmission points may also simultaneously transmit different data to a single UA, thereby increasing the transmission data rate to the UA. In joint transmission, multiple transmission points may also simultaneously transmit different data to a number of UAs, thereby increasing the throughput of the system. Alternatively, in dynamic node/cell selection, PDSCH transmissions occur from only one point within the CoMP cooperating set at a time.

As an alternative to JP, CoMP networks may implement Coordinated Scheduling or Coordinated Beamforming (CS/CB). Using CS/CB, data for a UA is first made available at the serving node/cell and transmitted to the UA from the serving node/cell, with user scheduling and beamforming decisions made to facilitate coordination among nodes/cells corresponding to the CoMP cooperating set.

In a CoMP network, several sets of CoMP assets may be defined. A CoMP "cooperating set" may include a set of points or network nodes or cells that may be geographically separated and may directly or indirectly use a PDSCH transmission directed to a particular UA. The identity of the assets allocated to a particular CoMP cooperating set may or may not be known by or be transparent to the UA. Within a CoMP cooperating set, CoMP "transmission points" include a point or set of points actively transmitting to the UA using the PDSCH. In the case of joint transmission, the CoMP transmission points may be the points in the CoMP cooperating set. In the case of dynamic node/cell selection, a single point may be the transmission point at every subframe. The transmission point may change dynamically within the CoMP cooperating set. In the case of CS/CB, the CoMP transmission point may correspond to the "serving node/cell".

A CoMP "measurement set" is a set of nodes/cells that belong to the CoMP cooperating set and are used to characterize the link between a UA and members of the CoMP cooperating set. Channel state or statistical information can be used to characterize the link between the members of the CoMP measurement set and the UA. The state or statistical information may then be reported and used by the system to ensure a high-quality link is established between the members of the CoMP cooperating set and the UA, for example, by readjusting the membership of the CoMP cooperating set. In some cases, the CoMP measurement set is the same as the CoMP cooperating set. Using the CoMP measurement set, the UA may down-select nodes/cells for which actual feedback information is transmitted. A Radio Resource Management (RRM) measurement set may be defined in support of RRM measurements as defined in Rel-8.

Figure 2:
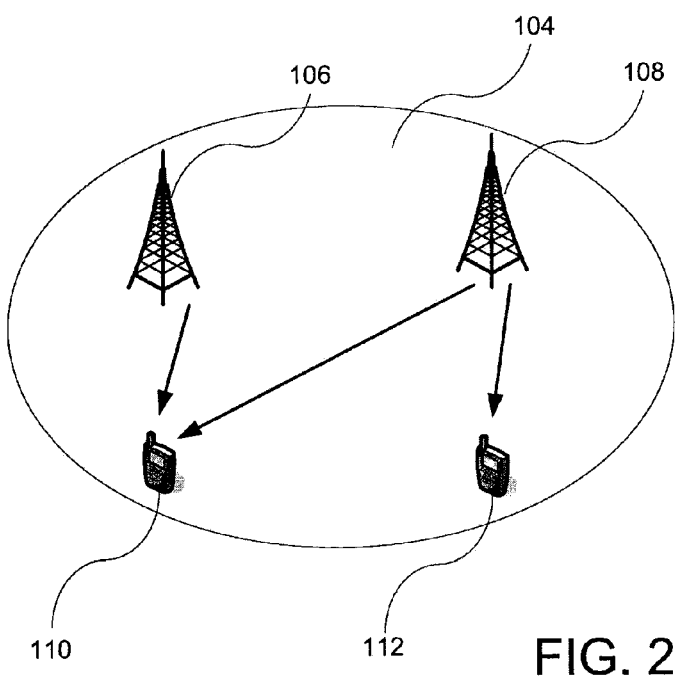
FIG. 2 is an illustration of a wireless communications network having two eNBs operating in a coordinated multi-point (CoMP) transmission and reception configuration.

FIG. 2 is an illustration of a wireless communications network having two eNBs operating in a coordinated multipoint (CoMP) transmission and reception configuration. A similar illustration can be applied to a combination of eNBs, RNs and/or cells. As illustrated in FIG. 2, in network coverage area 104, eNBs 106 and 108 are configured to transmit communication signals to UA 110. In network coverage area 104, any collaboration scheme may be used for eNBs 106 and 108. For example, in some CoMP schemes, eNB 106 and eNB 108 may work together to transmit the same signal to UA 110 at the same time. In such a system, the signals transmitted by the base stations combine (i.e., superpose) in the air to provide a stronger signal and thus increase the chance of transmission success. In other CoMP schemes, eNB 106 and eNB 108 transmit different signals to UA 110, which, for example, include different data that is to be communicated to UA 110. By transmitting different portions of the data through different eNBs, the throughput to UA 110 may be increased. The use of CoMP depends on many factors including channel conditions at UA 110, available resources, Quality of Service (QoS) requirements, etc. As such, in some network implementations, in a given node/cell or combination of nodes/cells only a subset of available UAs may be serviced with CoMP transmissions. For example, in FIG. 2, UA 112 is only served by eNB 108.

In networks implementing CoMP, difficulties may arise when multiple carriers are deployed in a base station or other network node such as an eNB, RN, or cell in a carrier aggregation configuration. Depending upon the network configuration, the number of carriers deployed in each cell, eNB or RN may vary. For example, an eNB or RN or cell in a hotspot location may have 5 carriers deployed while another eNB or RN or cell that is not in a hotspot location may have 2 carriers deployed. In that case, to implement successful cooperation and coordination of eNBs and/or RNs in a CoMP configuration it may be necessary to consider the set of carriers deployed in and made available by each cooperating eNB, RN, cell or network node.

To provide CoMP transmissions in a system employing non-uniform carrier aggregation, the system may be configured to implement one or more virtual carriers. For downlink (DL) communications, a virtual carrier may be created for a cell or a network node such as an eNB, or RN. The virtual carrier, unlike a conventional carrier, may not carry data that is transmitted by the node/cell itself, but is instead transmitted by a neighboring cooperating cell or node such as a neighbor eNB, or RN. Similarly, for uplink (UL) communications, a virtual carrier of a network node or cell may not include data that is received by the node/cell itself. Instead, the UL communications may be received by a neighboring cooperating node/cell. Depending upon the system implementation, a network node or cell implementing a virtual carrier may have one or more of the following attributes.

First, the network node or cell may advertise the existence of the DL and/or UL virtual carrier. The node/cell may use any suitable broadcast signal, such as BCCH signaling or dedicated signaling, to advertise the existence of the virtual carrier. The advertisement may optionally include additional information such as carrier bandwidth, carrier frequency, physical cell ID, channel configuration etc. for the virtual carrier. Second, the serving node/cell may assign a DL and/or UL virtual carrier to a UA. The assignment may be a carrier assignment and may be performed using at least one of layer 3 signaling such as Radio Resource Control (RRC) signaling, layer 2 signaling such as Media Access Control (MAC) control elements, and layer 1 signaling such as the PDCCH. Third, the serving node/cell may assign resources (e.g. PDSCH resources) on a DL and/or UL virtual carrier to a UA. Fourth, in the case of Discontinuous Reception (DRX) operations, the node/cell may instruct the UA to enable signal reception on a DL virtual carrier at a specific time, either implicitly or explicitly. Fifth, when the node (such as an RN) or cell does not transmit its own control channel (e.g. a PDCCH), the donor node/cell with which the RN is associated (i.e. a macro cell, an eNB or other network node) may transmit the control channel (e.g. PDCCH) to the UA for the assignment of resources on the virtual carrier, where the virtual carrier of the eNB is a physical carrier transmitted by the RN.

Figure 3:
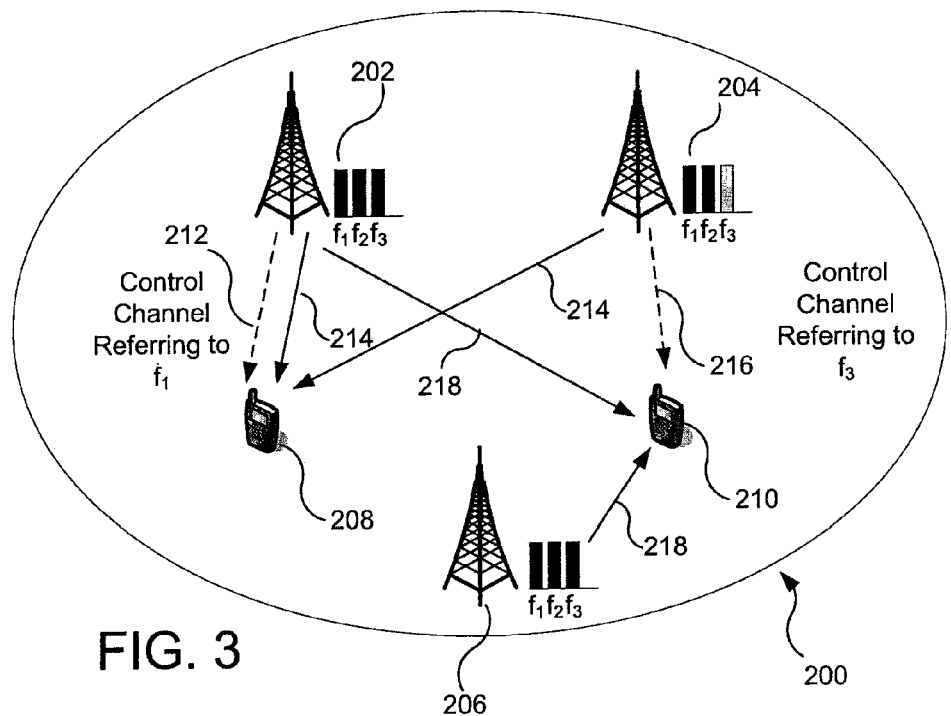
FIG. 3 illustrates a network that includes several physical carriers and a virtual carrier for one of the network nodes or cells.

As an example, FIG. 3 illustrates a network 200 that includes several physical carriers and a virtual carrier for one of the network nodes or cells. Referring specifically to FIG. 3, carriers f1, f2, and f3 are physical carriers of network nodes/cells 202 and 206. The operations of carriers f1, f2 and f3 may be implemented as in conventional wireless communication networks and nodes/cells 202, 204, and 206 may include any combination of appropriate network components such as eNBs, RNs, cells or other types of network nodes. In this case, carriers f1 and f2 are physical carriers of node/cell 204 and carrier f3 is established as a virtual carrier of node/cell 204. Node/cell 202 operates as the serving node/cell for UA 208 and node/cell 204 operates as the serving node/cell for UA 210. Nodes/cells 202 and 204 may advertise the three carriers and activate (or enable carrier reception of) all three carriers for UA 208 and UA 210, respectively. Note that FIG. 3 shows only the nodes/cells that are involved in the CoMP and virtual carrier operation.

In the network of FIG. 3, non-uniform carrier deployment can be used to address traffic loading requirements in certain hot-spot areas within, or overlapping with, one or more network nodes/cells. In FIG. 3, node/cell 202 and node 206 are located inside a hot-spot area whereas node/cell 204 is located adjacent to the hot-spot area.

As shown in FIG. 3, node/cell 202 may transmit a control channel (e.g. PDCCH) instruction 212 to allocate resources on carrier f1 to UA 208. In that case, both nodes/cells 202 and 204 may coordinate transmissions 214 to UA 208 on carrier f1 using a CoMP scheme. The transmissions may be identical, so as to improve the SINR of carrier f1 for UA 208, or may include different data, so as to increase the data rate of UA 208.

Also shown on FIG. 3, node/cell 204 also transmits a control channel instruction 216 to allocate resources on carrier f3 to UA 210. In this case, however, the serving node/cell, node/cell 204, cannot communicate with UA 210 using carrier f3. Instead, nodes/cells 202 and 206, both of which can use carrier f3, transmit signals 218 to UA 210 using carrier f3.

There are several reasons why node/cell 204 may choose to assign resources (e.g., carrier f3) that it does not physically transmit or receive, and that must be provided by other network nodes or cells. In this case, assume node/cell 204 is assigned the responsibilities of the serving node/cell for UA 210 because the signal from node/cell 204 to UA 210 is stronger than for the other nodes/cells. As serving node/cell, there are several reasons why node/cell 204 may assign resources or carriers that are to be provided by another network node or cell. UA 210 may be located at or close to the cell edge. As such, the CoMP transmissions on carrier f3 from nodes/cells 202 and 206 may provide a strong composite signal to UA 210. Alternatively, if carrier f3 is only transmitted by node/cell 202, but not by nodes/cells 204 and 206, the interference experienced by UA 210 on carrier f3 may be quite low. As such carrier f3 may provide a very high received SINR at UA 210. In that case, node/cell 204, the serving node/cell, may find it preferable for the services to be provided via carrier f3, even if the services must be provided by another cooperating node/cell and can only be provided by implementing CoMP. Also, node/cell 204 may choose to allocate resources on carrier f3 to offload any congestion on carriers f1 and f2 at node/cell 204. Similarly, node/cell 204 may already be transmitting to UA 210 on carriers f1 and/or f2, and can transmit a PDCCH instruction using either carrier f1 or f2 to UA 210 to allocate additional PDSCH resources on carrier f3 to UA 210. Finally, nodes/cells 202 and 206 may be two RNs which do not have PDCCH transmission capability. In that case, node/cell 204 may transmit PDCCH instructions to UA 210 to assign the PDSCH of the RNs on a physical carrier and/or virtual carrier of node/cell 204.

As such, the concept of a virtual carrier allows a component carrier to be advertised, activated, and allocated by a network node or cell in CoMP even though a signal is not transmitted on that carrier by the node/cell itself.

In one implementation, the control channel (e.g. PDCCH) is transmitted by the serving node/cell to the UA on a physical carrier of the serving node/cell. In the configuration shown in FIG. 3, for example, the control channel transmitted by node/cell 204 to UA 210 allocating resources on carrier f3 may be transmitted using either carrier f1 or f2. In another implementation, however, the control channel is transmitted to the UA on a virtual carrier associated with the serving node/cell. In the example shown in FIG. 3, control channel message 216 allocates resources on carrier f3 to UA 210 and may originate at node/cell 202 and/or node/cell 206. If the control channel for a component carrier must be transmitted using the same carrier as the traffic, control channel messages may be required to originate from nodes/cells other than the serving node/cell. In that case, in FIG. 3, the allocation of resources on carrier f3 may be done by node/cell 202 and/or node/cell 206, but not by node/cell 204. Alternatively, in some cases, only specific nodes/cells may be allowed to transmit control channels out of several nodes/cells that support CoMP operation on the virtual carrier of the serving node/cell.

Even though the traffic channel (e.g. PDSCH) and/or the control channel (e.g. PUCCH) may be transmitted by one or more non-serving nodes/cells, the traffic channel and/or the control channel may be transmitted using a format corresponding to the cell ID of the serving node/cell, for example, using serving eNB, RN or cell specific interleaving or scrambling etc. From the UA's perspective, the UA may only need to configure its receiver to receive the transmission formatted for the UA's serving eNB/RN or cell. Alternatively, the traffic channel and/or the control channel may be transmitted using the format that corresponds to a CoMP-specific cell ID previously provided to the UA by its serving eNB/RN or cell.

The present system may be configured to implement a Hybrid Automatic Repeat reQuest (HARQ) scheme for re-transmitting a traffic data packet to compensate for an incorrectly received traffic packet. A HARQ scheme may be used both in uplink and downlink transmissions in LTE systems. Take downlink transmissions for example. For each downlink packet received by a UA, a positive acknowledgment (ACK) may be transmitted on a Physical Uplink Control Channel (PUCCH) from the UA to the network node after a cyclic redundancy check (CRC) performed by the UA indicates a successful decoding. If the result of the CRC check indicates a packet is not received correctly, a UA HARQ entity transmits a negative acknowledgement (NACK) on the PUCCH to request a retransmission of the erroneously received packet. Once a HARQ NACK is transmitted to a network node, the UA waits to receive a retransmitted traffic data packet. When the HARQ NACK is received at a network node, the network node retransmits the traffic data packet to the UA. This process of transmitting, ACK/NACK and retransmitting continues until either the packet is correctly received or a maximum number of retransmissions has been reached.

In the present system, the UA may transmit a UL HARQ-ACK/NACK in response to a DL PDSCH transmission on a virtual carrier of a serving node/cell. In that case, the UA may transmit the UL HARQ-ACK/NACK using the UL carrier paired with the DL carrier upon which the control channel (e.g. PDCCH) originally allocating the PDSCH was transmitted. For example, with reference to FIG. 3, if control channel transmission 216 that originally allocated a PDSCH on carrier f3 to UA 210 was transmitted using carrier f1, UA 210 may transmit a UL HARQ-ACK/NACK on the UL carrier that is paired with carrier f1. In one case, the UL HARQ-ACK/NACK transmitted by UA 210 on the UL carrier paired with the DL carrier f1 is received only by its serving node/cell (i.e., node/cell 204). In another embodiment, the UL HARQ- ACK/NACK transmitted by UA 210 on the UL carrier paired with the DL carrier f1 is received by the serving node/cell (i.e., node/cell 204) in addition to other neighboring nodes/cells which have the UL carrier paired with the DL carrier f1.

In other implementations, if the control channel transmission 216 that allocated PDSCH resources on carrier f3 is transmitted using carrier f3 from node/cell 202 and/or node/cell 206 to UA 210, UA 210 may transmit an UL HARQ-ACK/NACK on the UL carrier paired with carrier f3. In one implementation, the UL HARQ-ACK/NACK transmitted by UA 210 on the UL carrier paired with the DL carrier f3 is only received by the node/cell that transmits the control channel, (e.g., node/cell 202 or node/cell 206 in FIG. 3). In another implementation, the UL HARQ-ACK/NACK transmitted by UA 210 on the UL carrier paired with the DL carrier f3 is received by the node/cell that transmits the control channel (i.e. node/cell 202 or node/cell 206) as well as other neighboring nodes/cells that have the UL carrier paired with the DL carrier f3. If carrier f3 does not have a paired UL carrier, the possible UL carrier and resource for uplink control channel and HARQ-ACK/NACK feedback may need to be configured.

The system may also be configured to implement DL HARQ-ACK/NACK transmissions formed in response to UL PUSCH transmissions from the UA that are sent using the virtual carrier of the serving node/cell. In one implementation, the DL control channel (e.g. PDCCH) that allocates the PUSCH resource on the virtual carrier is transmitted by the serving node/cell. In that case, the serving node/cell may transmit the DL HARQ-ACK/NACK (e.g. on the DL Physical HARQ Indicator CHannel (PHICH)) on the same carrier upon which the control channel (e.g. PDCCH) was transmitted. In another implementation, the serving node/cell as well as other neighbor nodes/cells simultaneously transmit the DL ACK/NACK (e.g. on the DL PHICH) to the UA on the same carrier as that of the control channel (e.g. PDCCH) that allocated the PUSCH resource. In yet another implementation, where the DL control channel (e.g. PDCCH) allocating the PUSCH resource on a virtual carrier is transmitted by a non-serving neighbor node/cell that has the corresponding UL carrier configured as physical carrier, the DL HARQ-ACK/NACK (e.g. on the DL PHICH) may be transmitted by the neighbor node/cell on the same carrier as the DL control channel. Alternatively, the DL HARQ-ACK/NACK (e.g. on the DL PHICH) may be transmitted simultaneously by the neighbor node/cell as well as the serving node/cell and other neighbor nodes/cells on the same carrier as the DL control channel.

The present virtual carrier may be used for carriers containing broadcast or multicast information. For example, in one implementation, a particular carrier frequency may be used to carry broadcast or multicast traffic. To achieve the desired coverage, only a subset of network nodes or cells may be required to transmit signals on the broadcast carrier. In that case, each of the subset of network nodes or cells may configure the carrier as a physical carrier, while the remaining network nodes or cells configure the carrier as a virtual carrier. A network node/cell that does not have a carrier physically configured may assign the broadcast or multicast resource on a virtual carrier to a particular UA that the node/cell serves.

To support carrier aggregation, the serving network node/cell may assign a UA a set of DL component carriers on which the UA should enable signal reception. The set of DL component carriers may be referred to as the "active carrier set." A UA may also be assigned a set of DL or UL component carriers that each map to assigned logical carrier indices. This set of DL or UL carriers may be referred to as the "DL or UL candidate carrier set." In one implementation, the active carrier set is a subset of the candidate carrier set. The serving network node/cell may also signal the UA to specify the configuration (e.g. bandwidth, carrier frequency, physical cell ID, channel configuration etc.) of each of the candidate carriers through, for example, broadcast or unicast RRC signaling. The candidate carrier set assigned to a UA may include physical carriers and/or virtual carriers of the serving node/cell. Similarly, the active carrier set assigned to the UA for enabling signal reception may include physical carriers and/or virtual carriers of the serving node/cell. One or more of the carriers within the active carrier set of the UA may be assigned as designated carriers. A designated carrier can be a carrier on which the UA monitors a control channel (e.g., the PDCCH). A designated carrier can also be a carrier where a full set of DRX parameters are configured for the UA. In addition, the designated carrier can be a carrier where the UA performs synchronization, receives system information broadcast, paging, etc. The designated carrier can also be a carrier where the UA's protocols association are defined, e.g., RRC connection, security key association etc. In one implementation, a designated carrier may be an anchor carrier. In that case, the designated carrier or the anchor carrier is a physical carrier of the serving node/cell. Alternatively, the designated carrier or the anchor carrier can be a virtual carrier of the serving node/cell.

For each of the carriers within the active carrier set of a UA, the different CoMP sets (e.g., CoMP cooperating set, CoMP transmission point/set and CoMP measurement set) are defined. For a particular carrier, for example carrier f1, the corresponding CoMP cooperating set includes nodes/cells that transmit using carrier f1. The corresponding CoMP transmission points include nodes/cells that transmit on carrier f1. Similarly, the corresponding CoMP measurement set includes nodes/cells that transmit on carrier f1.

In a given subframe, the serving node/cell may assign PDSCH resources to UAs served by the node/cell using control signaling (e.g., using the PDCCH). The assigned resources may be on any carrier within the active carrier set, notwithstanding whether the carrier is a physical or virtual carrier of the serving node/cell. The scheduling of the resource on the virtual carrier can be coordinated between the serving node/cell and other neighbor nodes/cells that are also scheduling PDSCH transmission for their own UAs on the same carrier.

CoMP or non-CoMP transmissions on a virtual or physical carrier of a node/cell may be multiplexed in Time Domain Multiplex (TDM) and/or Frequency Domain Multiplex (FDM) fashion. In the case of TDM, different subframes can be used for CoMP and non-CoMP transmissions. In the case of FDM, different Resource Blocks (RBs) within a subframe can be used for CoMP and non-CoMP transmissions.

The PDSCH transmission on the physical carrier or the virtual carrier can be scrambled by the serving eNB's, serving RN's or serving cell's cell ID or by the cell ID of one of the eNB or RN or cell that transmits on that carrier or by a CoMP specific cell ID. Similarly, the Demodulation Reference Signal (DMRS) locations and/or sequences in a subframe or in a CoMP resource region (e.g. a set of RBs) or in the PDSCH resource assigned to the UA within a subframe may also correspond to the cell IDs. The UA may not need to be informed of the eNBs or RNs or cells involved in the PDSCH transmission as long as the corresponding cell ID is provided to the UA. For Channel State Information RS (CSI-RS), to allow the UA to measure the DL channel from different nodes/cells involved in CoMP transmissions to the UA, the CSI-RS transmitted by different nodes/cells on a carrier may use different locations and/or sequences. In some cases, the CSI-RS may only be transmitted by a node/cell on its physical carrier but not on its virtual carrier.

The serving node/cell may also configure DRX parameters for the carriers within the active carrier set and candidate carrier set of the UA, regardless of whether the carrier is a physical carrier or virtual carrier of the serving node/cell.

From the network perspective, a number of neighboring nodes/cells form a CoMP cooperating set and CoMP transmission point/set. The CoMP transmission point/set may be a subset of the corresponding CoMP cooperating set. The same CoMP cooperating set can be applied to one or more UAs. Similarly, the same CoMP transmission point/set can be applied to one or more UAs. The same node/cell may belong to one or more CoMP cooperating sets and one or more CoMP transmission points/sets. Different CoMP cooperating sets may not have the same members. Similarly, different CoMP transmission points/sets may not have the same members.

For each CoMP cooperating set, there may be an associated carrier list, $C_{CoMP}$, that is the union of all the physical carriers of all the members of the CoMP cooperating set that may be used for CoMP transmissions to UAs associated with the CoMP cooperating set. The carrier list represents the carriers that can be used for CoMP transmission. Some of the physical carriers in the list may be virtual carriers associated with some of the members of the cooperating set. In one implementation, a CoMP cooperating set may have multiple different carrier lists, with each list serving one or more associated UAs. A UA may be informed (e.g. through RRC signaling from the serving node/cell) of the configuration (e.g. bandwidth, carrier frequency, physical cell ID, channel configuration, etc.) of each carrier in the carrier list of the UA's CoMP cooperating set.

The CoMP measurement set defined for a UA may be a subset of the CoMP cooperating set to which the UA belongs. The UA may be informed (e.g. through RRC signaling from the serving node/cell) of the members of the CoMP measurement set and the corresponding physical carriers of each member. After receiving the membership and physical carrier information, the UA may measure or report the DL channel condition. The set of physical carriers on which the measurement may be performed can be a subset of the carrier list associated with the CoMP cooperating set.

A UA may be assigned multiple CoMP measurement sets with each CoMP measurement set corresponding to a carrier within the active carrier set of the UA. For each of the carriers within the active carrier set, the UA may measure the DL channel from the nodes/cells within the corresponding CoMP measurement set. The channel measurement may be performed on the CSI-RS transmitted by the nodes/cells within the CoMP measurement set on the corresponding carrier.

To assign the most suitable CoMP sets to the UA, the UA may need to monitor the signal strength from neighbor nodes/cells on an on-going basis and provide measurement reports to the serving node/cell. The serving node/cell can instruct the UA to monitor the signal strength from certain nodes/cells on some or all of the carriers within the active carrier set and/or candidate carrier set of the UA. A member node/cell in the monitoring set of a UA for a particular carrier may not be a member node/cell in the CoMP measurement set of the UA on that carrier.

A monitoring set may be defined for a carrier within the active carrier set. For a carrier in the candidate carrier set but not in the active carrier set, a monitoring set may also be defined such that the UA monitors the signal strength from nodes/cells within the monitoring set on that carrier. If the carrier for which a monitoring set is defined is not within the active carrier set of the UA, the UA may enable signal reception on that carrier during the signal strength measurement intervals. The intervals can be configured by the serving node/cell. The UA reports the measured signal strength of the nodes/cells within the monitoring set to the serving node/cell. Based on the reported measurement, the serving node/cell can determine the appropriate CoMP sets for the UA on one or multiple carriers. The serving node/cell may also update the candidate carrier set and the active carrier set of the UA. In one implementation, the monitoring set described above is also an RRM measurement set used for handover operation.

The present system may be further generalized for virtual resource assignment by a network node or cell. A virtual resource of a node/cell is the resource (DL or UL) of another node/cell defined by, but not limited to, the carrier frequency, resource block (RB) indices and cell ID (or cell ID specific transmission format such as scrambling, interleaving, etc.) of that node/cell. The serving node/cell of a UA may signal the assignment of DL and/or UL virtual resources to the UA. Virtual resource indices or indications can be defined to uniquely identify a particular combination of carrier index, RB index and node/cell ID.

The virtual resource can be defined on a virtual carrier or a physical carrier of the serving node/cell. In one implementation, where the virtual resource is defined on a physical carrier of the serving node/cell, the serving node/cell can also transmit to a UA on the same physical time-frequency resource (e.g., RBs) as that of the virtual resource assigned to another UA. In some cases, the serving node/cell assigning virtual resources of another node/cell will not preclude the serving node/cell from serving its own UAs on the same physical resources (e.g., RBs).

Depending upon network loading, it may be desirable to reconfigure the use of virtual carriers at different times of the day. As mentioned earlier with reference to FIG. 3, virtual carriers may be used to assist with the traffic loading in a hot-spot area. In some cases, however, the hot-spot may only exhibit a high demand for wireless resources during certain times of the day. For example, a business area where many workers are present during weekdays may have high traffic demands during the weekdays, but light traffic loading during evenings, nights, and weekends.

Figure 4:
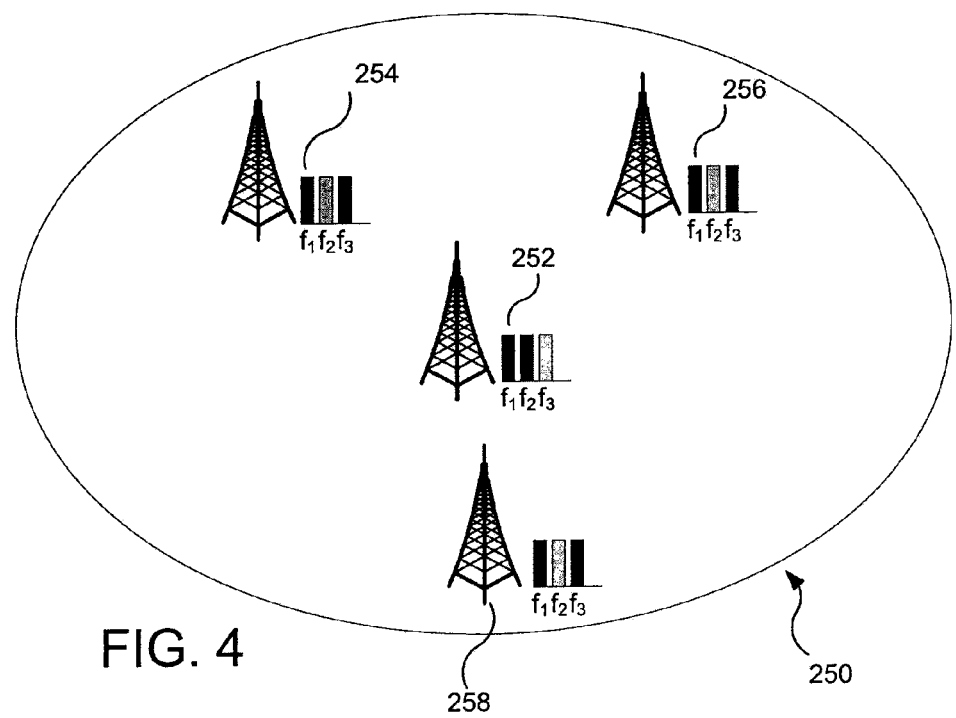
FIG. 4 is an illustration of a network for implementing CoMP having non-uniform carrier deployment and virtual carriers to manage traffic loads that vary with time.

FIG. 4 is an illustration of network 250 for implementing CoMP to manage traffic loads that vary with time. Node/cell 252 serves a business hot-spot area as described above. The neighboring nodes/cells (254, 256 and 258) serve more residential areas (e.g., apartment buildings) that would be expected to have lower demand for resources during weekdays, but higher demand in the evenings and weekends. Although the example network illustrated by FIG. 4 may apply to eNBs, the system may also apply to a combination of eNBs, RNs, cells and/or other types of network nodes.

As shown in FIG. 4, each example node/cell transmits on only two physical carriers, although different combinations of physical carriers are transmitted within the network. As such, the network of FIG. 4 may be implemented using network nodes or cells that are only equipped to transmit on two carrier frequencies and may be, therefore, cheaper, more compact, and use less power than other network nodes or cells that support more carriers. Additionally, the use of different carrier frequencies at different nodes/cells may reduce inter-node/cell interference, especially for edge-of-cell UAs.

Due to the varying carrier frequency assignments, during weekdays, nodes/cells 254, 256 and 258 may assist with improving total throughput in the central hot-spot node/cell 252 by allowing carrier f3 to be used as a virtual carrier by node/cell 252. In that case, node/cell 252 selects a particular set of neighboring nodes/cells to perform the transmission to a specific UA depending upon the UA's location relative to the neighboring nodes or cells.

Similarly, during non-hot-spot times (e.g. evenings and weekends), carrier f2 as transmitted from node/cell 252 may be used as a virtual carrier by the neighboring nodes or cells (nodes/cells 254, 256 and 258).

Virtual carrier reconfigurations may occur automatically within network 250 with certain nodes/cells ceasing advertising and/or phasing out operation of virtual carriers provided by neighboring nodes/cells. Similarly, some nodes/cells might also initiate advertising of virtual carriers at appropriate times. Virtual carriers may also be dynamically configured or disabled as the network reacts to existing or anticipated loading conditions. The group of nodes/cells participating in virtual carrier reconfiguration and sharing may coordinate among themselves to determine when a virtual carrier and/or physical carrier should start or cease operation.

In other implementations, any nodes/cells transmitting more than one carrier could physically shut down some of the node/cell's carriers at certain times of the day if demand loading is sufficient low. For example, a multi-carrier base station might only need to maintain one carrier in the middle of the night to handle a low level of traffic, while the remaining physical carriers are shut down to reduce total power consumption.

Virtual cells may be created with different nodes/cells and virtual carriers used for UL and DL transmissions. For example, a UA may transmit on the UL to the UA's serving node/cell and the serving node/cell may schedule the UA for DL transmission on a cooperating node/cell's carrier that is a virtual carrier for the serving node/cell.

In one example implementation, the cooperating node/cell sends both the PDCCH and the PDSCH to the UA and the entire carrier is a dedicated carrier for CoMP UAs. The interleaving for the PDCCH control channel elements (CCEs) and the scrambling of the PDCCH and the PDSCH may use a CoMP virtual cell ID. In another implementation, the interleaving for the PDCCH CCEs and the scrambling of the PDCCH and the PDSCH can use a cooperating node/cell's cell ID. In that case, the DL carrier transmitted by the cooperating node/cell can be used for both CoMP UAs served by nodes/cells in the cooperating set as well as non-CoMP UAs served by the cooperating node/cell. This case may be useful if the UA's serving node/cell DL carrier is over-loaded or if the UA's preferred DL node/cell (e.g. node/cell with the strongest DL signal received at the UA) is different from the UA's serving node/cell which is the preferred UL node/cell (e.g. node/cell with the strongest UL signal received from the UA). The latter scenario can occur in relay deployment where the UL and DL signal strength between the UA and the eNB or RN is imbalanced, where, on the UL, the RN has the strongest signal reception from the UA while on the DL the UA receives the strongest signal from the eNB. This is because an RN typically has lower DL transmit power than an eNB. In this case, an RN may be a UA's serving node/cell since the path loss between the RN and the UA is the smaller compared to the path loss between the RN and the eNB. This example is illustrated in FIG. 5.

Figure 5:
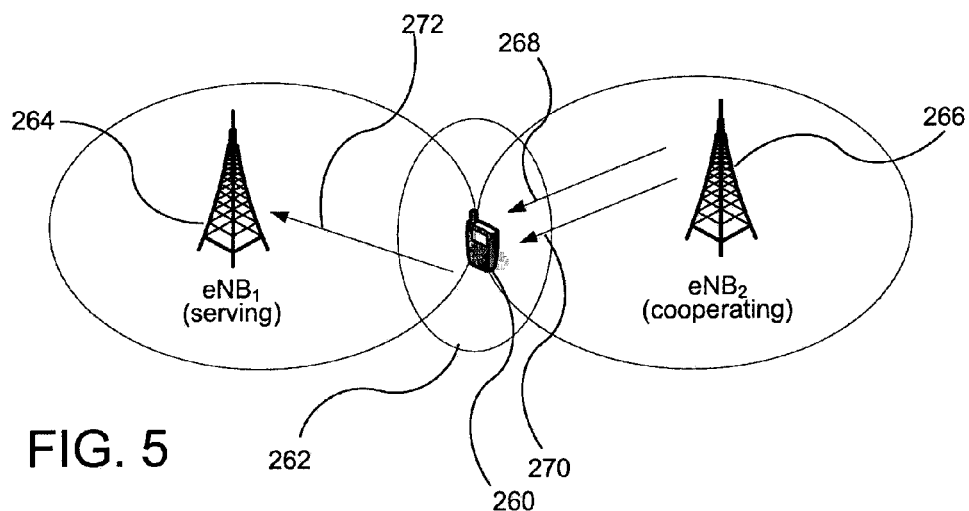
FIG. 5 is an illustration of a UA occupying a virtual cell served by two network nodes or cells, wherein the serving node/cell receives the uplink (UL) transmissions from the UA and schedules the downlink (DL) transmissions on a cooperating node/cell's carrier, which is a virtual carrier for the serving node/cell.

FIG. 5 is an illustration of UA 260 located within a virtual cell 262 served by network nodes/cells 264 and 266, wherein the serving node/cell receives the UL transmissions from the UA and schedules the DL transmissions on a cooperating node/cell's carrier, which is a virtual carrier for the serving node/cell. In FIG. 5, the serving node/cell for UA 260 is node/cell 264, while the cooperating node/cell is node/cell 266. UA 260 receives DL control transmission 268 from cooperating node/cell 266. UA 260 also establishes a DL carrier with cooperating node/cell 266 in order to receive data transmissions. A UL carrier, however, is established by UA 260 on serving node/cell 264. As shown, UA 260 transmits data to node/cell 264 as illustrated by transmission 272. In another embodiment, the UA may also establish a UL transmission to the cooperating node/cell on a physical carrier of the cooperating node/cell, in addition to the UL transmission established with its serving node/cell. The UL transmission to the cooperating node/cell may include UL control channel transmissions (e.g. PUCCH) such as HARQ-ACK/NACK in response to DL transmissions from the cooperating node/cell. The UL transmission to the cooperating node/cell may also consist of feedback information including DL channel conditions (e.g. channel quality indicators, channel state information, precoding matrix indicators, etc.) between the cooperating node/cell and the UA. In this case, the UL transmission to the serving node/cell may only consist of UL traffic data (e.g. PUSCH). In yet another embodiment, the UA may receive DL HARQ-ACK/NAK transmissions from the serving node/cell on a DL control channel (e.g. PHICH) transmitted on a DL carrier of the serving node/cell, in response to the UL data transmission to the serving node/cell.

Figure 6:
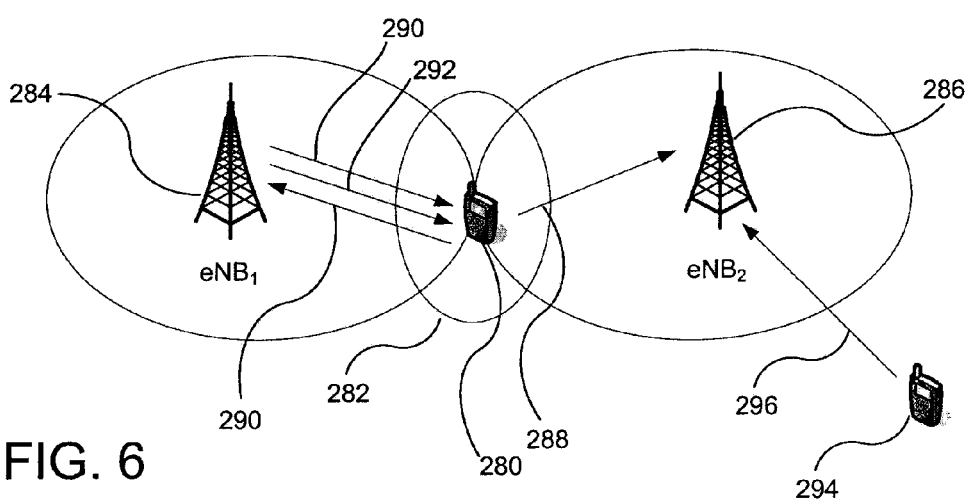
FIG. 6 is an illustration of a UA occupying a virtual cell served by two network nodes or cells, wherein the DL data is sent by the serving node/cell and the UL data is received by the cooperating node/cell.

Similarly, if the UA's serving node/cell has an overloaded UL carrier and a neighboring cooperating node/cell has an additional carrier, the serving node/cell may schedule the UA's UL data on the cooperating node/cell's additional carrier. The cooperating node/cell's additional carrier may be a virtual carrier of the serving node/cell. There can be other scenarios where the serving node/cell may schedule the UA's UL data on the cooperating node/cell's carrier. In one scenario, the UA may be located within the coverage of a neighboring cooperating node/cell. In addition, the interference or Interference over Thermal (IoT) on a UL carrier configured at the cooperating node/cell may be quite small if neighbor nodes/cells do not configure the same carrier. Therefore, the UA's UL signal reception at the cooperating node/cell may still be acceptable or can be very good even though the UA may be physically located further away from the cooperating node/cell than the serving node/cell. In another scenario, the UA's preferred DL node/cell and serving node/cell (e.g. node/cell with the strongest DL signal received at the UA) is different from the UA's preferred UL node/cell (e.g. node/cell with the strongest UL signal received from the UA). This scenario can occur in relay deployment where the UL and DL signal strength between the UA and the eNB/RN is imbalanced, where, on the UL, the RN has the strongest signal reception from the UA while on the DL the UA receives the strongest signal from the eNB. This may be because an RN typically has lower DL transmit power than an eNB. In this case, the eNB may be the UA's serving node/cell because the RN may not have its own unique cell ID and other necessary functions that constitute a serving cell for a UA. In that case, the UA's DL control instructions may still be sent on the serving node/cell's carrier. FIG. 6 is an illustration of UA 280 located within a virtual cell 282 served by network nodes/cells 284 and 286, wherein the DL data is sent by the serving node/cell and the UL data is received by the cooperating node/cell. In FIG. 6, the serving node/cell for UA 280 is node/cell 284, while the cooperating node/cell is node/cell 286. UA 280 receives DL control transmission 290 and DL data 292 from serving node/cell 284. UA 280 also establishes a UL carrier with cooperating node/cell 286 in order to send data transmissions 288.

As shown in FIG. 6, the UL carrier of the cooperating node/cell 286 can accommodate both CoMP UAs and non- CoMP UAs. The CoMP UAs served by node/cell 284 are scheduled UL data transmission on the UL carrier by the serving node/cell 284. Node/cell 286 can also schedule its own UAs (e.g., UA 294) on the same and/or remaining UL resources of the UL carrier as indicated by element 296. The CoMP UAs use the cell ID of the cooperating node/cell for scrambling the PUSCH. In one embodiment, UA 280 may send the PUCCH on a carrier that belongs to its serving node/cell 284 (e.g. transmission 290), as shown in FIG. 6. The PUCCH transmission may consist of UL HARQ-ACK/NAK in response to the DL data transmission from the serving node/cell. In yet another implementation, the UA may receive DL HARQ-ACK/NAK transmissions from the cooperating node/cell on a DL control channel (e.g. PHICH) transmitted on a DL carrier of the cooperating node/cell, in response to the UL data transmission to the cooperating node/cell.

Figure 7:
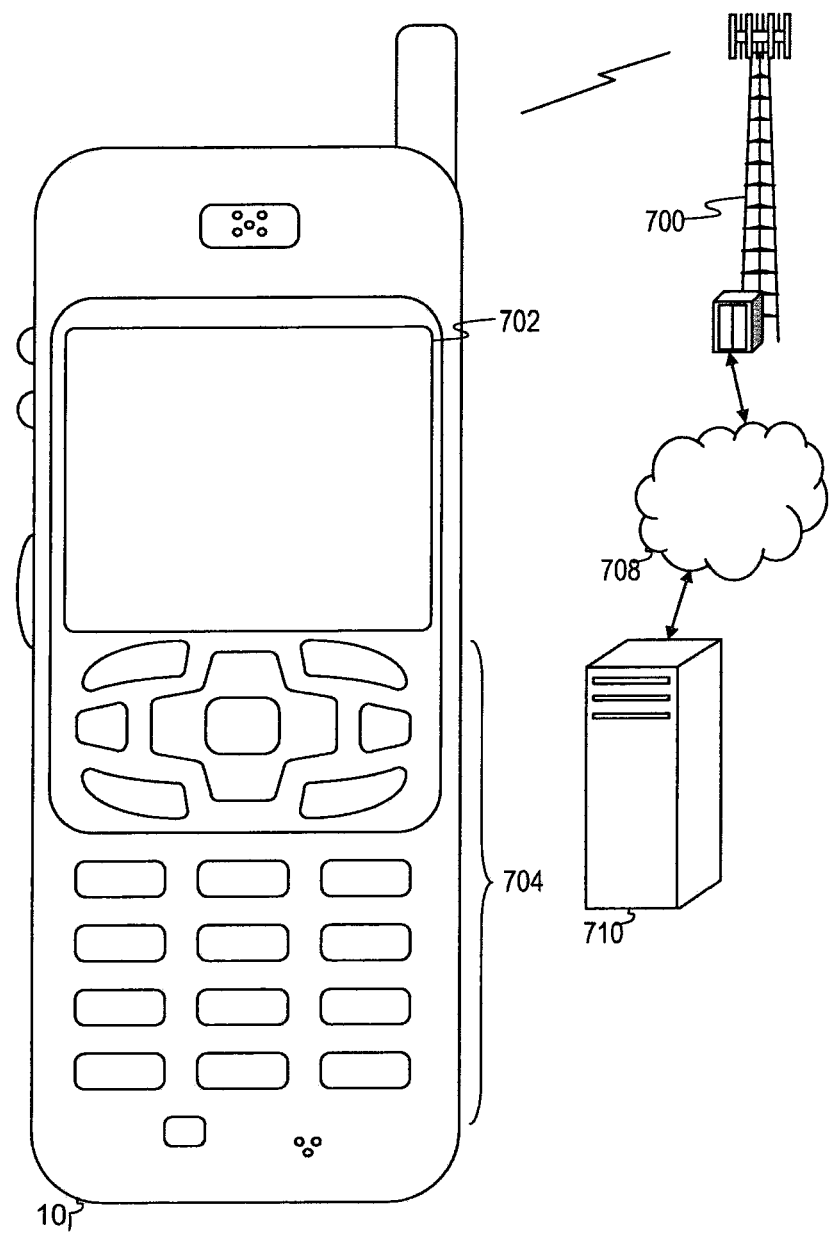
FIG. 7 is a diagram of a wireless communications system including a UA operable for some of the various embodiments of the disclosure.

FIG. 7 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
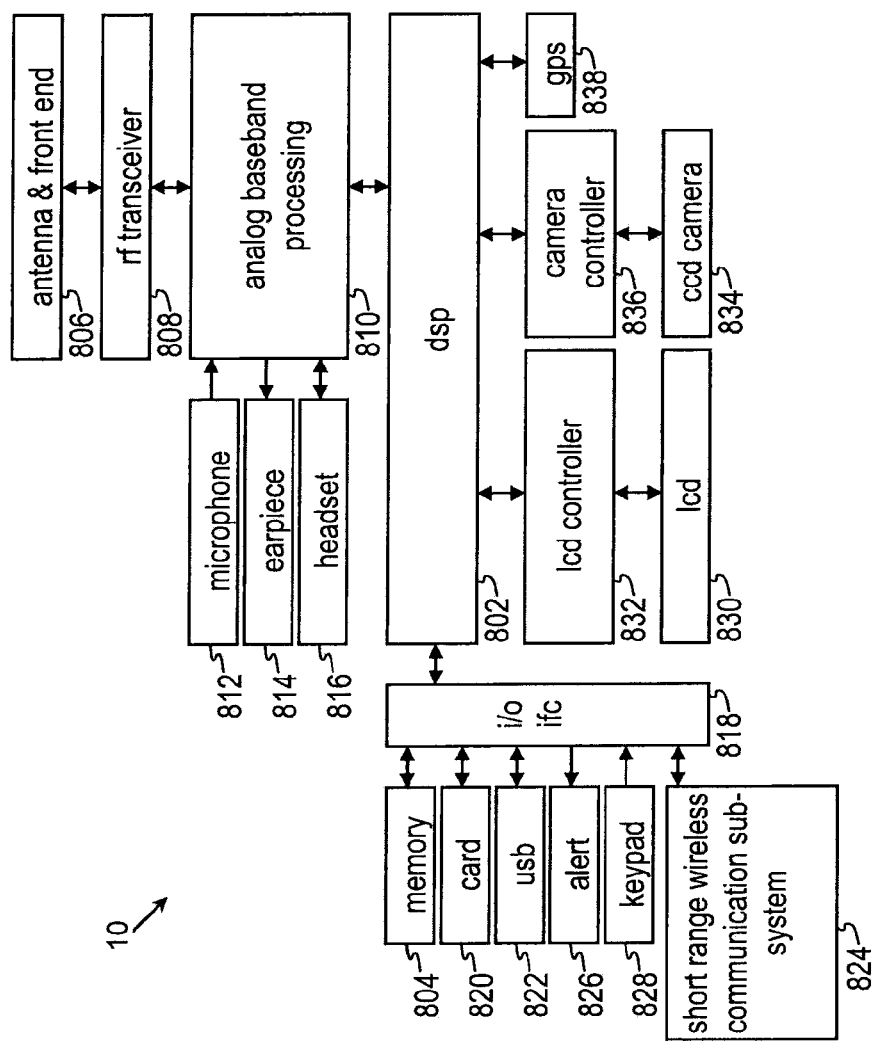
FIG. 8 is a block diagram of a UA operable for some of the various embodiments of the disclosure.

FIG. 8 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
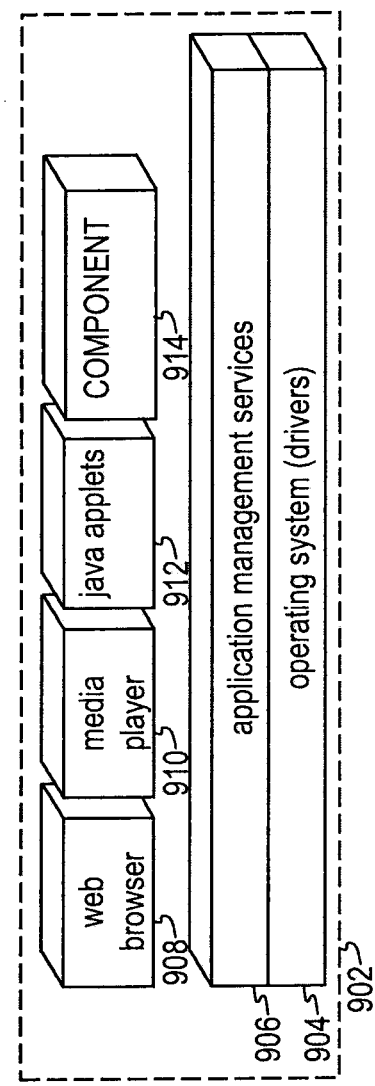
FIG. 9 is a diagram of a software environment that may be implemented on a UA operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services (AMS) 906 that transfer control between applications running on the UA 10. Also shown in FIG. 9 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 10:
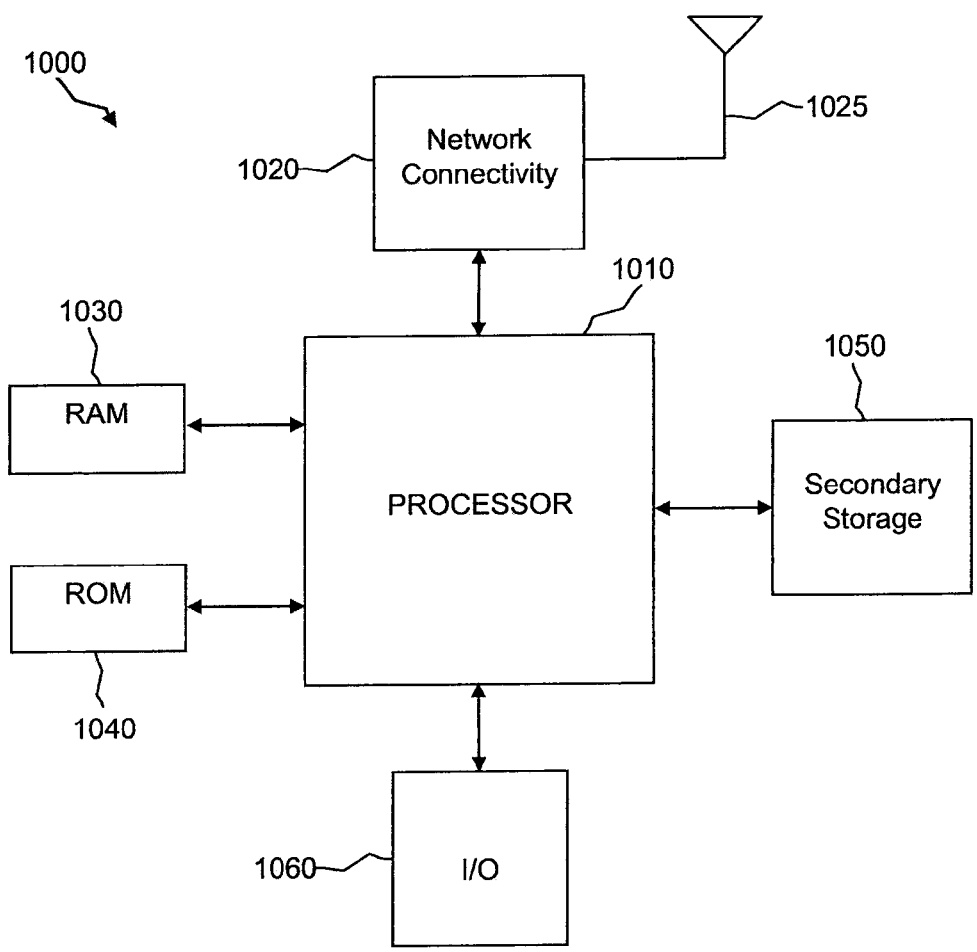
FIG. 10 is an illustrative general purpose computer system suitable for some of the various embodiments of the disclosure.

The UA 10, base station 120, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

1. A method for implementing coordinated communication in a wireless network system including a first serving network node and a second cooperating network node, the method including:
   configuring a first transmission channel, the first transmission channel being established on the first serving network node, wherein the first serving network node is configured to advertise the existence of a second transmission channel via at least one of broadcast control channel (BCCH) signaling or dedicated signaling;
   configuring the second transmission channel, the second transmission channel being established on the second cooperating node, wherein the first transmission channel and the second transmission channel are configured with different component carriers having different carrier frequencies;
   transmitting control information from the first serving network node to a user agent (UA) using the component carrier configured for the first transmission channel, the control information allocating a resource on the component carrier configured for the second transmission channel, wherein the resource is allocated by the first serving network node to schedule a data transmission between the UA and the second cooperating network node via the component carrier configured for the second transmission channel;
   receiving uplink control information from the UA on the component carrier configured for the first transmission channel, wherein the uplink control information includes a Physical Uplink Control Channel (PUCCH) transmission to the first serving network node; and
   receiving uplink data from the UA on the component carrier configured for the second transmission channel, wherein the uplink data includes a Physical Uplink Shared Channel (PUSCH) transmission to the second cooperating network node.

2. The method of claim 1, wherein the control information includes a Physical Downlink Control Channel (PDCCH) transmission.

3. The method of claim 1, wherein the first serving network node and the second cooperating network node include at least one of an evolved universal terrestrial radio access network (E-UTRAN) node B (eNB), a relay node (RN) and a cell.

4. The method of claim 1, wherein the first serving network node is a donor node and the second cooperating network node is a relay node (RN) associated with the donor node.

5. The method of claim 4, wherein the donor node is a donor evolved universal terrestrial radio access network (E-UTRAN) node B (eNB).

6. The method of claim 1, wherein the resource on the second transmission channel is at least one of a Physical Downlink Shared CHannel (PDSCH) and a Physical Uplink Shared CHannel (PUSCH) resource.

7. The method of claim 1, including signaling the UA to add the component carrier established on the cooperating network node to a carrier set of the UA using the first serving network node.

8. The method of claim 7, wherein the carrier set of the UA includes a component carrier, the component carrier being established on at least one of the serving network node and the cooperating network node and belonging to at least one of a CoMP cooperating set, a CoMP measurement set and CoMP transmission points.

9. The method of claim 1, wherein the first and second transmission channels include different transmission resources.

10. The method of claim 9, wherein the different transmission resources are uniquely defined by at least one of carrier frequency, cell-specific transmission format, and time-frequency physical resources.

11. The method of claim 1, including:
disabling the second transmission channel at a first time; and
enabling the second transmission channel at a second time.

12. The method of claim 11, wherein the first or second time is at least partially determined by at least one of loading conditions, time-of-day, and quality of service of at least one of the first network node and the second network node.

13. The method of claim 1, wherein the second cooperating node belongs to at least one of a CoMP cooperating set, a CoMP measurement set and CoMP transmission points.

14. The method of claim 1, including assigning the second transmission channel to a User Agent (UA) using at least one of layer 3 signaling, layer 2 signaling and layer 1 signaling using the first serving network node.

15. The method of claim 1, including the first serving network node signaling the UA to enable signal reception on the component carrier configured for the second transmission channel.

16. A method for implementing coordinated communication in a wireless network system including a first network node and a second network node, the method including the steps of:
configuring a first transmission channel, the first transmission channel being established on the first network node, and the first transmission channel being used for downlink (DL) transmission to a user agent (UA), wherein the first network node is configured to advertise the existence of a second transmission channel via at least one of broadcast control channel (BCCH) signaling or dedicated signaling;
configuring the second transmission channel, the second transmission channel being established on the second network node, and the second transmission channel being used for uplink (UL) transmission from the UA,
wherein the first transmission channel and the second transmission channel are configured with different component carriers having different carrier frequencies;
transmitting control information from the first network node to the UA using the component carrier configured for the first transmission channel, the control information allocating a resource on the component carrier configured for the second transmission channel, wherein the resource is allocated by the first network node to schedule a Physical Uplink Shared Channel (PUSCH) transmission of uplink data from the UA to the second network node via the component carrier configured for the second transmission channel; and
receiving uplink control information from the UA on the component carrier configured for the first transmission channel, wherein the uplink control information includes a Physical Uplink Control Channel (PUCCH) transmission to the first network node.

17. The method of claim 16, wherein the method further comprises the first network node receiving uplink control information directly from the UA on a physical carrier deployed by the first network node, wherein the first network node is a serving network node, and the second network node is a cooperating network node.

18. The method of claim 16, wherein the first network node is a cooperating network node, and the second network node is a serving network node.

19. The method of claim 16, where the first transmission channel and second transmission channel form a cell.

20. A wireless communications system, comprising:
a first base station including a first component carrier, the first component carrier being physically transmitted by the first base station, and a second component carrier, the second component carrier being a virtual carrier that is not physically transmitted by the first base station; and
a second base station including a third component carrier, the third component carrier being physically transmitted by the second base station,
wherein the first base station is configured to advertise, via at least one of broadcast control channel (BCCH) signaling or dedicated signaling, the existence of at least one of the second component carrier or the third component carrier,
wherein the first base station is configured to transmit control information to a user equipment (UE) using the first component carrier, the control information allocating a resource on the second component carrier, wherein the resource is allocated by the first base station to schedule a Physical Uplink Shared Channel (PUSCH) transmission from the UE to the second base station, wherein the PUSCH transmission includes receiving uplink data from the UE on the second component carrier or the third component carrier,
wherein the first base station is further configured to receive uplink control information from the UE on the first component carrier, wherein the uplink control information includes a Physical Uplink Control Channel (PUCCH) transmission to the first base station,
wherein the first component carrier and the second component carrier are configured with different carrier frequencies, and wherein the second component carrier is physically transmitted by the second base station.

21. A wireless communication system for implementing coordinated communication, including:
a first network node including a first transmission channel, the first transmission channel being used for downlink (DL) transmission to an access device, wherein the first network node is configured to advertise the existence of a second transmission channel via at least one of broadcast control channel (BCCH) signaling or dedicated signaling; and a second network node including the second transmission channel, the second transmission channel being used for uplink (UL) transmission from the access device, wherein the first network node is configured to transmit control information to the access device using the first transmission channel, the control information allocating a resource on a physical carrier configured for the second transmission channel, wherein the first transmission channel and the second transmission channel are configured with different component carriers having different carrier frequencies, wherein the resource is allocated by the first network node to schedule a Physical Uplink Shared Channel (PUSCH) transmission of UL data from the access device to the second network node via the physical carrier configured for the second transmission channel, and wherein the first network node is configured to receive UL control information from the access device on a physical carrier configured for the first transmission channel, wherein the UL control information includes a Physical Uplink Control Channel (PUCCH) transmission to the first network node.

22. The system of claim 21, wherein the first network node is a serving network node, and the second network node is a cooperating network node.

23. The system of claim 21, wherein the first network node is a cooperating network node, and the second network node is a serving network node.

24. The system of claim 21, wherein the first transmission channel and second transmission channel form a cell.

25. A user agent (UA) for communicating with a wireless communication system implementing coordinated communication, the wireless communication system including a first serving network node and a second cooperating network node, the UA comprising:

a memory device storing instructions; and a processor coupled to the memory device, the processor being configured to execute instructions stored on the memory device such that when executed, cause the UA to perform the following steps:

communicate using a first transmission channel, wherein the first transmission channel is established on the first serving network node, and wherein the first serving network node is configured to advertise the existence of a second transmission channel via at least one of broadcast control channel (BCCH) signaling or dedicated signaling;

communicate using the second transmission channel, wherein the second transmission channel is established on the second cooperating network node, wherein the first transmission channel and the second transmission channel are configured with different component carriers having different carrier frequencies;

receive control information from the first serving network node using the first transmission channel, the control information allocating a resource on the component carrier configured for the second transmission channel, wherein the second transmission channel is not established on the first serving network node;

transmit uplink data to the second cooperating network node using the resource allocated on the component carrier configured for the second transmission channel, wherein the uplink data includes a Physical Uplink Shared Channel (PUSCH) transmission from the UA; and transmit uplink control information on the component carrier configured for the first transmission channel, wherein the uplink control information includes a Physical Uplink Control Channel (PUCCH) transmission to the first serving network node.

26. The UA of claim 25, wherein the control information includes a Physical Downlink Control Channel (PDCCH) transmission.

27. The UA of claim 25, wherein the resource on the second transmission channel is at least one of a Physical Downlink Shared Channel (PDSCH) or a Physical Uplink Shared Channel (PUSCH) resource, and wherein the UA is configured to communicate directly with the first serving network via at least one of a Physical Downlink Control Channel (PDCCH) or a Physical Uplink Control Channel (PUCCH).

28. The UA of claim 25, wherein the processor is further configured to add a component carrier established on the second cooperating network node to a carrier set of the UA in accordance with signaling information received from the first serving network node.

29. The UA of claim 25, wherein the first and second transmission channels include different transmission resources.

30. The UA of claim 29, wherein the different transmission resources are uniquely defined by at least one of carrier frequency, cell-specific transmission format, and time-frequency physical resources.

31. The UA of claim 25 wherein the processor is further configured to process at least one of layer 3 signaling messages, layer 2 signaling messages and layer 1 signaling message to identify the second transmission channel.

32. The UA of claim 25, wherein the processor is further configured to receive data from the first serving network node instructing the UA to enable signal reception from the second cooperating network node on the component carrier configured for the second transmission channel.

33. A user agent (UA) for communicating with a wireless communication system implementing coordinated communication, the wireless communication system including a first network node and a second network node, the UA comprising:

a memory device storing instructions; and a processor coupled to the memory device, the processor being configured to execute instructions stored on the memory device such that when executed, cause the UA to perform the following steps:

receive downlink (DL) transmissions from an access device using a first transmission channel on the first network node, wherein the access device is configured to advertise the existence of a second transmission channel via broadcast control channel (BCCH) signaling;

transmit uplink (UL) transmissions to another access device using the second transmission channel on the second network node, wherein the first transmission channel and the second transmission channel are configured with different component carriers having different carrier frequencies;

receive control information from the access device using the component carrier configured for the first transmission channel on the first network node, the control information allocating a resource on the component carrier configured for the second transmission channel on the second network node;

use the resource allocated on the component carrier configured for the second transmission channel to transmit UL data to the other access device, wherein the UL data from the UA includes a Physical Uplink Shared Channel (PUSCH) transmission to the other access device; and transmit UL control information to the access device via the component carrier configured for the first transmission channel, the UL control information including a Physical Uplink Control Channel (PUCCH) transmission from the UA.

* * * * *